Dec. 12, 1950 D. R. PUTT 2,533,326
MAGNETIC STORAGE COMPARING AND CONTROL SYSTEM
Original Filed July 1, 1940 6 Sheets-Sheet 1
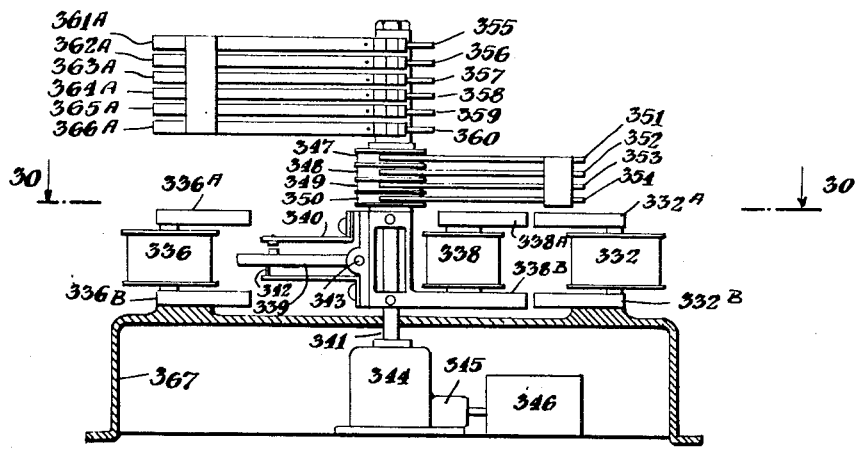
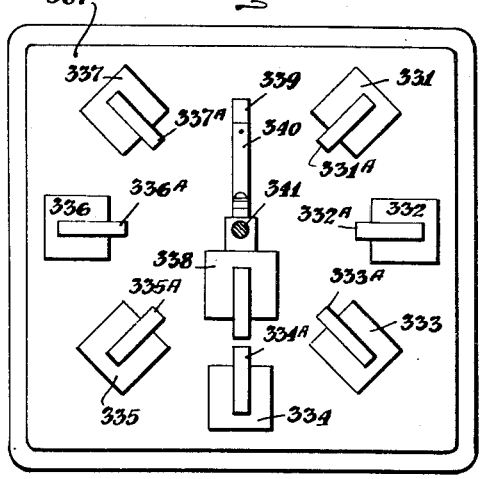
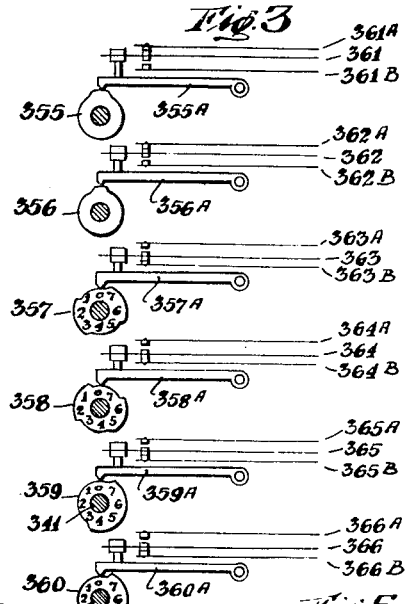
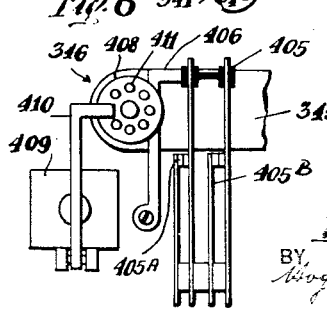
INVENTOR
*Donald R. Putt*
BY
*August, Meary & Campbell*
his ATTORNEYS

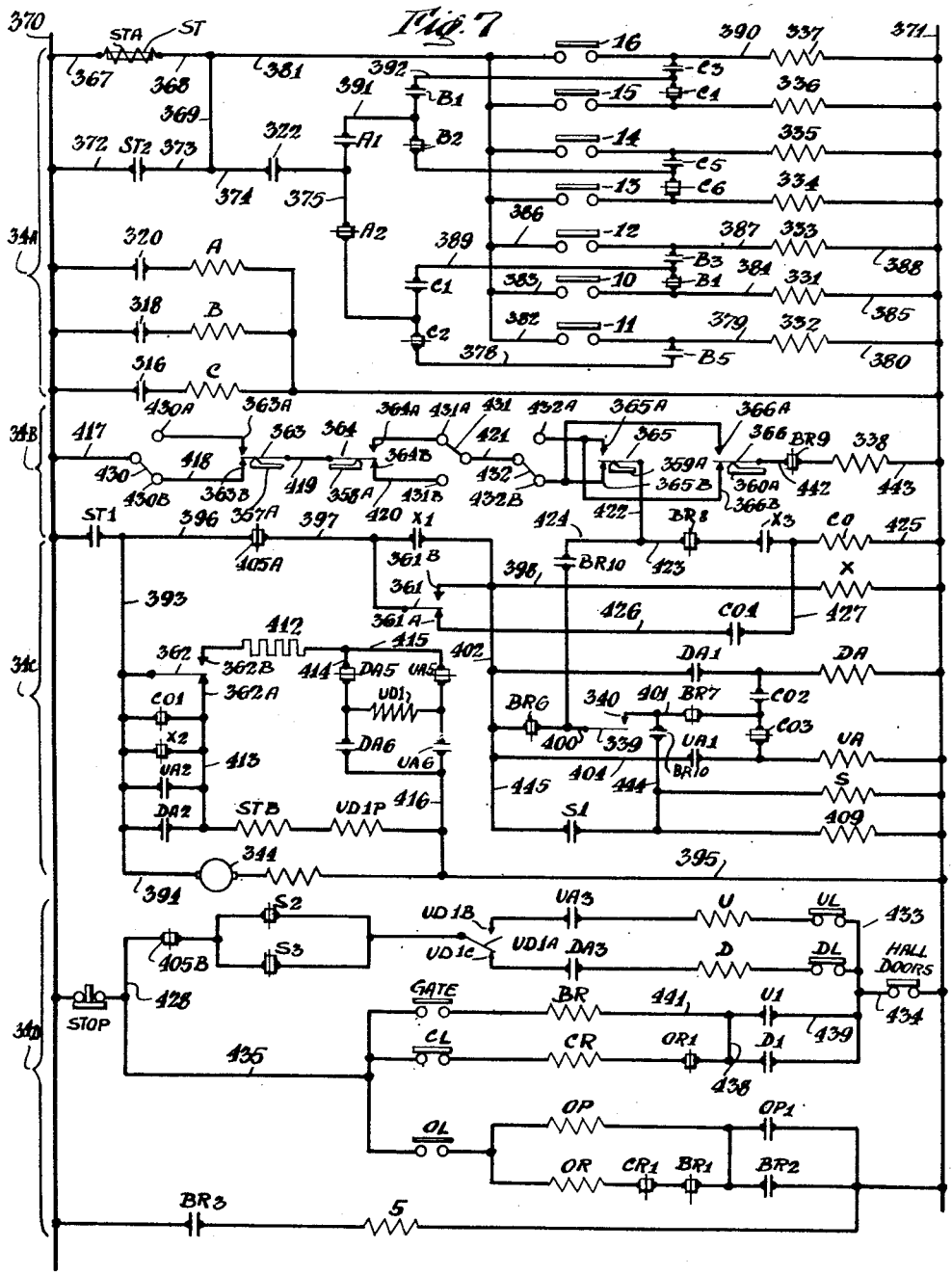

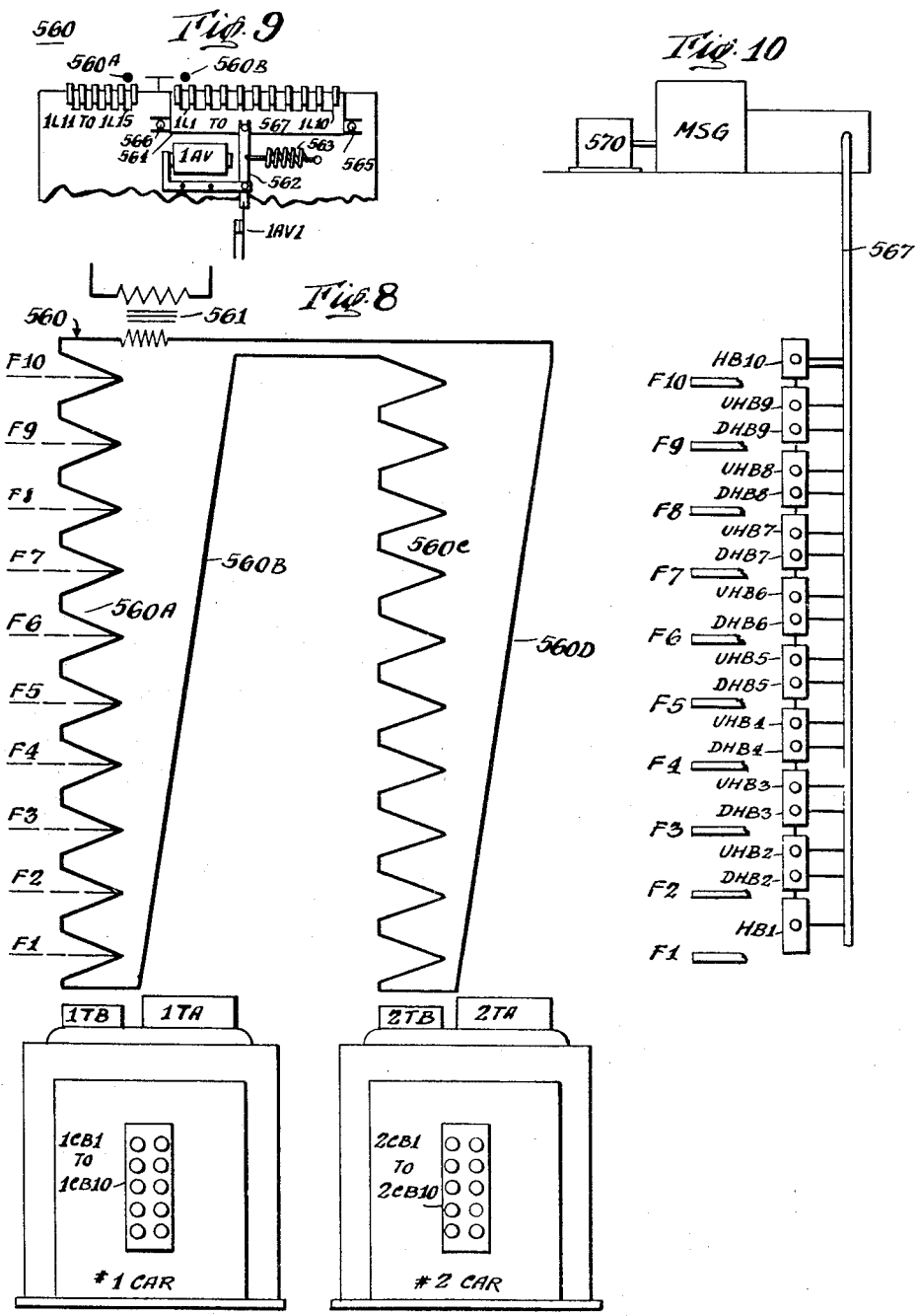

Dec. 12, 1950 D. R. PUTT 2,533,326
MAGNETIC STORAGE COMPARING AND CONTROL SYSTEM
Original Filed July 1, 1940 6 Sheets-Sheet 4
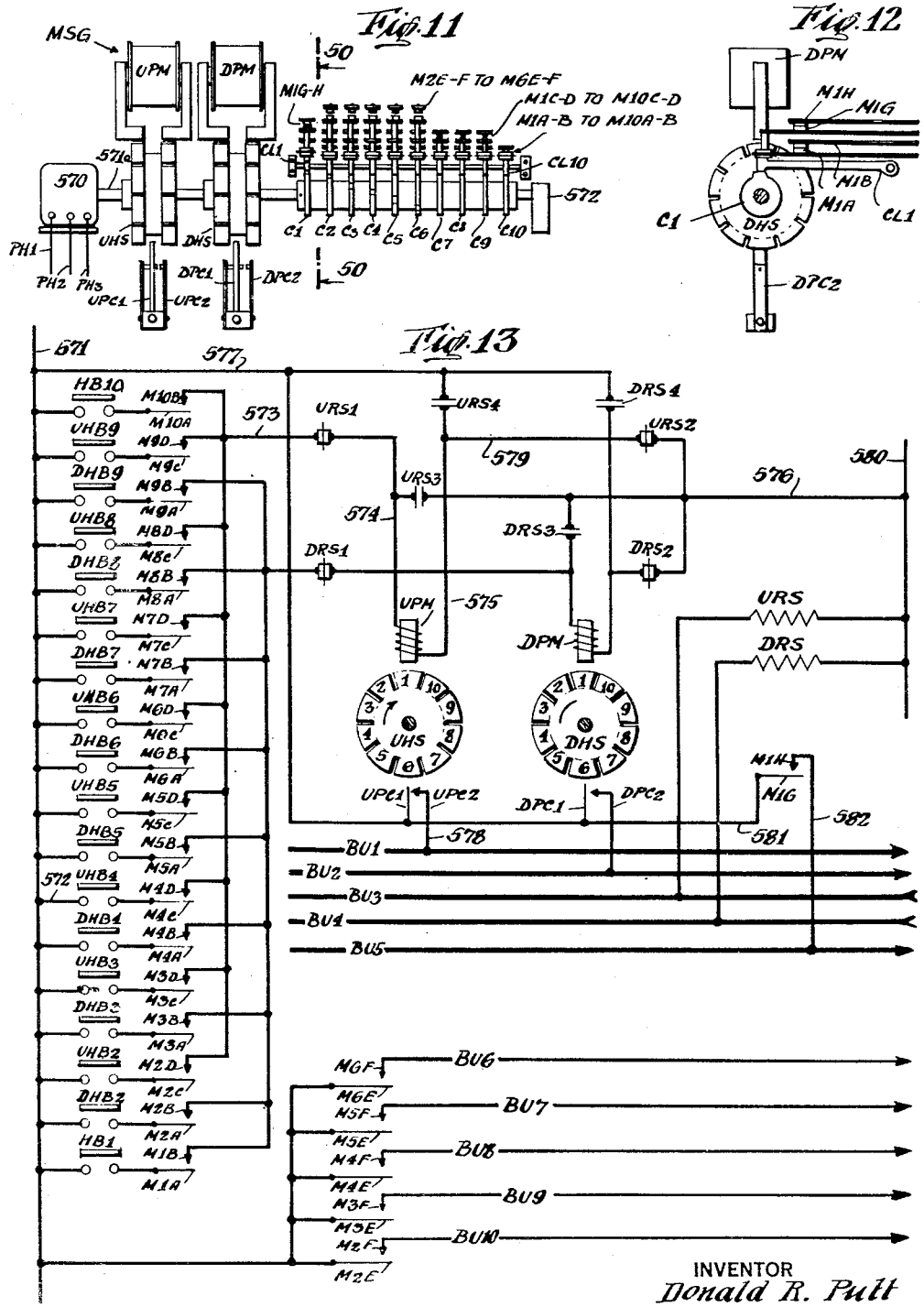
INVENTOR
Donald R. Putt
BY
ATTORNEYS

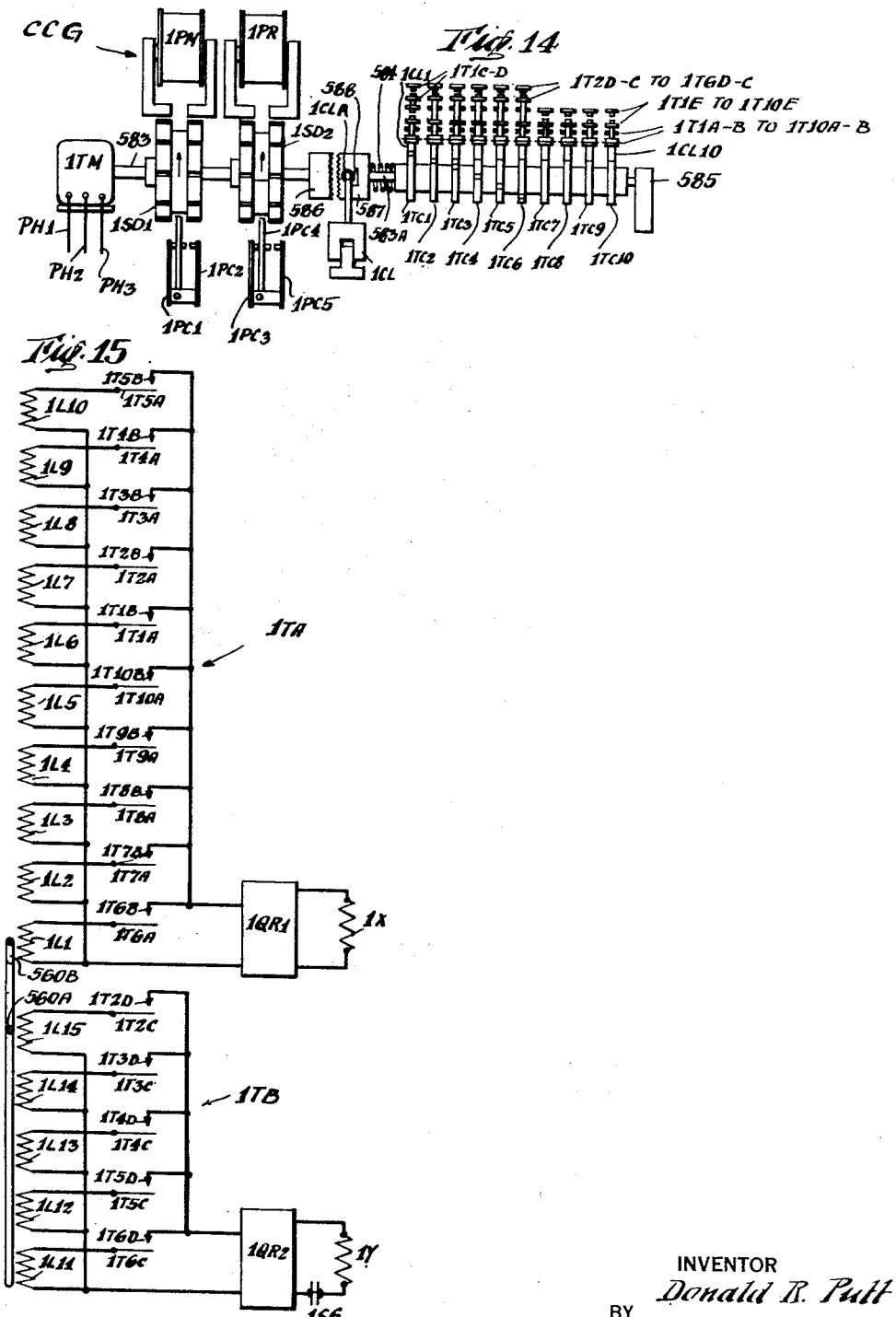

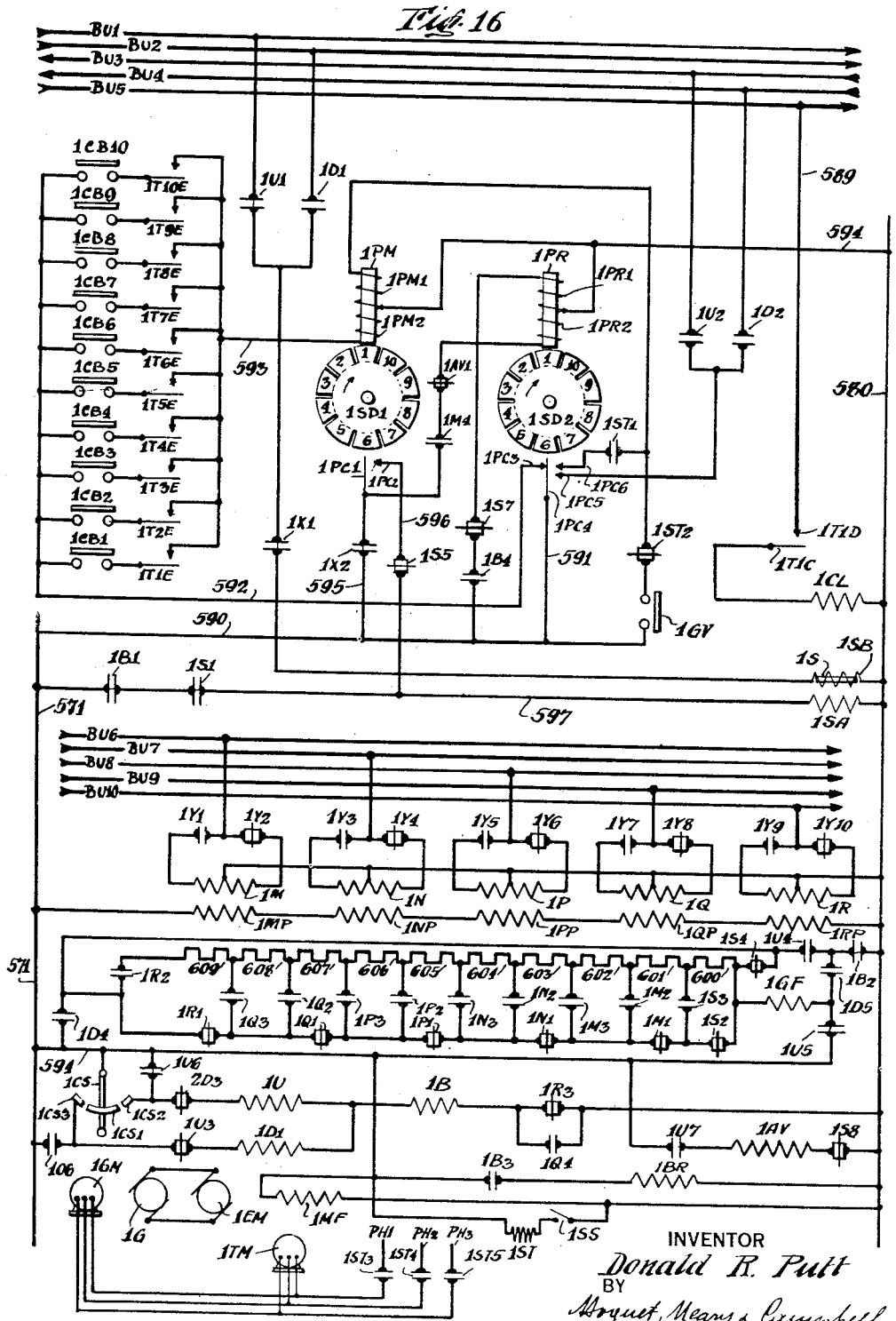

Patented Dec. 12, 1950

2,533,326

UNITED STATES PATENT OFFICE 2,533,326

MAGNETIC STORAGE COMPARING AND CONTROL SYSTEM

Donald R. Putt, Jersey City, N. J.

Original application July 1, 1940, Serial No. 343,400, now Patent No. 2,474,861, dated July 5, 1949. Divided and this application July 2, 1949, Serial No. 102,894

3 Claims. (Cl. 177—353)

My invention relates to control systems, and more particularly to an improved method and means for automatically or selectively controlling a process or apparatus, or a plurality or group of these, in any desired manner. This application is a division of application Serial No. 343,400, filed July 1, 1940, which has been issued as Patent No. 2,474,861.

My invention contemplates a method and means for directing or controlling the steps or operations of processes or apparatuses operated by a source of motive power in which the control of the application of power depends at least in part on the condition of the process or apparatus, and includes the generation of a different signal or code for each condition, which signal or code is also indicative of such conditions, which signals comprise a code and transmitting all of the different code signals over the same system to the control for the source of power directing or controlling the steps or operations, as the case may be. My invention also includes control means of miniature size for receiving and storing control impulses from remote locations to be collected and carried out in sequence, depending upon the condition of the process or position of the object being controlled.

By way of example, my invention is applicable to control the steps of a chemical process in an order or nature determined at least in part by the condition of the process; and to control the operation of power-operated machines, such as gun mountings and elevators wherein the positioning of the object effects the generation of a signal different for each predetermined position and which is indicative of the particular position for which the signal is generated. The signal or signals generated by the condition of a process or the positioning of movable objects are transmitted to a control means in a code, that is, in combinations of mechanical or electrical impulses, or combinations of consecutive spaces and impulses. As the signals are received by the control means, the signals are decoded to effect the operation or energization of the control means in accordance with the condition or position of the process or objects being controlled to initiate an operation which alters such condition or position. The signals may also be used to indicate at a remote location the condition of the process or position of the object being controlled.

It will be obvious that my invention is applicable to many processes and apparatuses, but for simplicity and merely for purposes of illustration, I have illustrated my invention as applied to an elevator system, controlled manually, semiautomatic or fully automatic, and as a single car or as a unit of a bank of cars. The advantages accrued by the application of my invention to the elevator art are similar to those obtained in other arts.

In accordance with my invention, the position of the car is indicated to the control means by different combinations of signal indications or impulses which vary in character, or by different combinations generated simultaneously or in cycles of consecutive spaces and impulses. The signals may be generated mechanically, magnetically, inductively or by any other appropriate mechanical, electrical or electronic means. The car position signals are generated and transmitted from the car as a code over a greatly reduced number of wires to the control means or to car position indicators which may be remotely located with respect to the elevator car or hatch.

I also provide as a part of my invention a storage means with a scanning device which not only selects calls but also determines automatically the direction of car movement. The storage and scanning means of my invention eliminates the heretofore necessary selector mechanism of the prior art and at the same time provides a control means which is of miniature proportions.

The storage means of my invention may be mechanical or magnetic. My copending application for Electrical Controls, Serial No. 269,546, filed April 22, 1939, which has been issued as Patent No. 2,484,049, shows several forms of magnetic storage means which are also applicable to elevator systems. The mechanical storage means of my invention is operated by a single electromagnet in response to calls to register the effect of the call in a storage device which operates directly to sense the direction in which the car is to move and to stop the car at the proper floor. In the magnetic form of storage means, the call is registered by storing magnetic flux in a magnetic storage means corresponding to the floor on which the call is received. This magnetic flux operates directly or in turn to determine the direction of movement of the car and to stop the car at the floor from which the call has been received. In scanning operations, either the scanning means or the storage means may be moved relative to the other, as exemplified by the forms of my invention to be hereinafter described.

In each form of the invention, there is a minimum number of movable parts and switching mechanism, and in the magnetic form of storage means there are no friction engaging or rubbing parts between the scanning and storage elements. The mechanical or magnetic storage forms of my invention are restored to normal by a single reset element which is so arranged as to restore the mechanical storing elements or the magnetic flux representing a registered call immediately after the call has been answered by the car.

In accordance with my invention, I also provide a method and means for generating different signals as a code indicative of the actuated car buttons which is transmitted over a minimum number of wires to the control means remotely located with respect to the car.

The coding and decoding features of my invention provide substantial advancements over the prior art, in that a large number of floors may be serviced with a minimum number of wires between the car and the control means and for the car position indicators. Thus, while the car position may be transmitted by a code from the car to the control means, the calls initiated by the car buttons may also be conveyed by a code system from the car to the control means. The decoding means for the control means and the car position indicators may comprise several forms, a few of which are described hereinafter.

The apparatus embodying my invention has fewer parts than the constructions heretofore provided for obtaining the same or similar functions and can be made much more compact and in relative miniature proportions, while at the same time enabling more readily the control of more complicated functions and operations.

One of the objects of my invention is to provide a new method and means for directing or controlling the steps or operations of processes or apparatuses motivated by a source of power in which the control of the application of power depends at least in part on the condition of the process or apparatus, and includes the generation of a signal different for each condition, and transmitting all of the signals as a code over the same system to the source of power directing or controlling the steps or operations.

Another object of my invention is to provide a control means of miniature size for receiving and storing control impulses from remote locations, which are then used for controlling the operation of a process or device depending upon the condition of the process or the position of the device being controlled.

Another object of my invention is to provide a method and means for generating signals in different combinations of impulses, either simultaneous or in consecutive order with predetermined spacing, which are indicative of the functions or operations of the process or apparatus to be controlled, storing the generated signals, subsequently sensing or scanning the stored signals in a predetermined and selective manner such that the reaction of the storage means or the scanning means achieves the subsequent control, and erasing the stored signals as they are answered.

Another object of my invention is the provision of signal generating and storing apparatus in which a number of wearing parts heretofore required are eliminated and the size of the apparatus materially reduced as compared with apparatus heretofore proposed for carrying out the same or similar functions.

An additional object of my invention is to provide a system in which the call storage means, the selector, and the call reset means are combined into a single physical and operative unit, thereby eliminating the many parts, extensive wiring circuits, and complicated installations heretofore necessary.

Another object of my invention is to provide a control means for elevator systems or the like adapted to receive signals transmitted as a code which are indicative of the car position and/or hall button actuated over a minimum number of wires, storing the call signals and operating a scanning means in response to the car position signals to sense stored calls and thereby determine the direction of movement of the car and to stop the car at the floor for which the call is intended.

Another object of my invention is to provide a control system for elevators which materially reduces the number of wires between the car and the control means or the car position indicators.

Another object of my invention is to provide a control means for an elevator system which is of miniature size and comprises relatively few moving parts which are adapted to be initiated by a call to determine the direction of movement of the car, to receive and store additional calls and subsequently cancel all calls registered in the direction of car movement as they are answered by the car.

Another object of my invention is to provide a control means for a bank of elevator cars which eliminates the heretofore elaborate cross connections and bulky control means, provides for storing all calls received from the floors serviced and directs the car nearest the floor from which the call is received to stop at that floor without effecting the operation of the other cars.

A further object of my invention is to provide for the formation of the code signals by means on the elevator car and in the hatch that are in either or both conductive or inductive relation.

A further object of my invention is to provide a method of and means for generating one or more signals to be transmitted simultaneously as a code over the same system (multi-element single position), the presence or absence of one or more signals in one or more parts of the system at given different times indicating the different conditions of the process or apparatus being controlled, and utilizing these code signals to control the apparatus.

Still a further object of my invention is to provide a method of and means for generating a single impulse positioned relatively to the beginning and end of a given time cycle, the relative position of the impulse constituting different code signals which indicate the condition of the process or apparatus being controlled, and controlling the same with reference to such condition.

Another object of my invention is to provide a call storage system in which a single electromagnet is used to store any amount of calls from different floors, irrespective of their number, thereby eliminating the prior art necessity of a relay for each floor.

Still a further object is to make provisions in the call storage system to reset any amount of stored calls with one electro-magnet, when the calls have been answered, thereby eliminating the contacts on the selector for each floor for resetting the relays as used in the prior art.

A further object of my invention is to provide a control in which different code signals are formed corresponding to the different conditions of the thing to be controlled and to utilize these code signals in achieving the control as well as to operate an indicator illustrating the condition of the thing being controlled.

An additional object of the invention is to provide a process and means to compare two or more signals, each generated as a code by one of a plurality of machines or processes to determine which of several processes or machines is best suited to perform the function desired.

It is, in addition, an object of my invention to provide a process and means to form code signals indicative of the functions to be performed and to compare these signals with code signals indicating the condition of one or more means capable of performing the function, and to achieve the performance when the means is in condition to perform the function.

A more particular object of my invention is to achieve any of the above objects in connection with the construction and operation of elevators, position controls and similar devices.

Other objects and advantages of the invention will become apparent upon consideration of the following detailed description of the several embodiments of the invention taken in conjunction with the accompanying drawings, in which:

Figure 1 is a view in elevation of a form of control means having a magnetic storage device, magnetic scanning means and a magnetic reset device for cancelling registered calls immediately after the calls have been answered;

Figure 2 is a sectional view taken along line 30—30 of Figure 1, showing the magnetic storage and scanning means in plan;

Figure 3 is a view in side elevation of a series of cam operated switches with the cams laid apart to show the relation therebetween;

Figure 4 is a schematic illustration of code generating mechanism operable in conjunction with the magnetically operated control means;

Figure 5 is a schematic illustration of an alternative mechanism for generating code signals;

Figure 6 is a fragmentary view of a time delay mechanism;

Figure 7 is a schematic wiring diagram for automatically operating the mechanism shown in Figures 1 to 6 inclusive;

Figure 8 is a diagrammatical illustration in vertical elevation of a bank of two elevator cars and an electric cable arrangement for the hatches thereof which provides an inductive field at different locations at the different floors to actuate the leveling means and car position indicator means;

Figure 9 is a diagrammatical illustration of the induction coil for the car position indicating circuits of one of the elevator cars;

Figure 10 is a diagrammatical illustration of the hall push buttons and the connections therefrom to the control means;

Figure 11 is a view in vertical elevation of the master storage generator;

Figure 12 is a sectional view taken substantially along line 50—50 of Figure 11;

Figure 13 is a schematic illustration of a wiring diagram for the hall push buttons and magnetic storing means of the master storage generator;

Figure 14 is a view in vertical elevation of a car code signal generator for storing calls from the car push buttons and car position code signal transmitter;

Figure 15 is a schematic illustration of a wiring diagram for the leveling and car position induction coils; and Figure 16 is a schematic illustration of a wiring diagram for connection with the busses of the wiring diagram of Figure 13 showing the control circuit, including the car push buttons which are provided for each car of a bank of elevator cars subject to control from the master storage generator of Figure 11.

Referring to the drawings, one form of mechanism for generating code signals applicable to an elevator system is shown diagrammatically in Figures 1 to 7. A form of magnetically operated control means is shown. This form of control means is capable of being constructed in miniature proportions for relatively large elevator systems. One of the features of this form of the invention is the utilization of a magnetic means for the storing of calls magnetically, whether received from the hall push buttons or from the car push buttons by code. This form also materially reduces the number of wires heretofore required between the elevator car and the control means. The new magnetic control means is also adapted to receive the car position by code, thereby further reducing, especially for relatively large systems, the number of wires heretofore required.

For purposes of illustration, the magnetic control means comprises a seven floor installation and therefore a series of seven magnetic storage elements 331 to 337 (Fig. 2). Each of the magnetic storage elements is provided with a U-shaped core having pole pieces, such as 336A and 336B. It is to be understood, of course, that this form of the invention may comprise a great many more magnetic storage elements for larger installation.

The control means is provided with a shaft 341 driven from a motor 344 located within the base member 367. The magnetic storage elements are mounted on the base member in an annular arrangement about the shaft 341 which carries a polarized arm 339 pivoted at 343 and normally resting on a support 342. The arm 339 is adapted to engage the contact 340 when the arm is magnetically lifted from the support 342.

The shaft 341 also carries a reset electromagnet 338 which is provided with a U-shaped magnetic core having pole pieces 338A and 338B. When the pole pieces 338A—B are momentarily magnetized by momentary energization of the reset magnet 338, the polarity of the pole pieces 338A—B is such as to cancel or reverse any stored magnetic flux, due to a stored call in the magnetic storage element that happens to be opposite the pole pieces of the magnet 338 upon or immediately after energization thereof.

Mounted on the shaft 341 above the polarized switch arm 339 is a group of slip rings 347 to 350 with cooperating brushes 351 to 354, respectively, which provide circuit connections to the polarized switch contacts 339 and 340, and leads for the reset electromagnet 338.

The car button code signal generating means illustrated in Figures 24 to 26 of my Patent No. 2,474,861 is readily adaptable for use with this form of magnetically operated control means. To decode the car button code signals, the switches 316, 318 and 320 (Figures 24 to 26 of my Patent No. 2,474,861 and Fig. 1 herein 34) control circuits connected in series with the coils of the magnetic storage elements and in parallel with the hall buttons 10 to 16. Since the illustration is for seven floors only, the car push buttons 302 to 308 will be regarded as the push buttons for floors 1F to 7F, respectively, the button 301 being dispensed with in the form or used for some other purpose.

A group of cams 355 to 360 (Figs. 1 and 3) are carried by the shaft 341 to operate a series of switches 361 to 366, respectively. The purpose of the first two cams, 355 and 356, is to control the operation of the motor 344 in response to a signal from either a car or hall button and to keep the motor running until after the car has answered all of the calls stored in the system. The cams 357, 358 and 359 are associated with switches 363, 364 and 365 (Figure 3) which provide a code signal generating system adapted to scan the car position code signals. The cam 360 and the associated switch 366 is arranged to control the energization of the reset electromagnet 338 to reverse the polarity of the magnetic storage element after a stored signal has been answered.

Before describing the mechanism and the method in detail, it is desirable to understand generally the mode of operation of this embodiment of the invention which will now be described briefly.

When a call is made by either a push button in the hall or in the car, the corresponding magnetic storage element will be energized. Assuming that the magnet 336 has been energized, the pole pieces 336A and 336B will be magnetized with a polarity such as north and south, respectively. The outer end of the contact arm 339 is permanently polarized as the south pole, so that the arm will be attracted toward the pole piece 336A when the arm passes between the pole pieces 336A and 336B, as it is revolved by the shaft 341. This upward movement of the arm 339 towards the pole piece 336A operates to momentarily close the switch contacts 339 and 340 at the time the arm 339 is adjacent the magnetic storage element 336. The shaft 341 rotates at a constant rate, for example, about five times per second. Each time that the arm 339 passes adjacent the magnetic storage element 336, the switch 339—340 will be closed. If the magnetic storage elements corresponding to the fourth and sixth floors, for example, have been activated either by the car button or the hall button on these floors, the switch 339—340 will close each time the arm 339 passes underneath the activated magnetic storage elements. This will continue because the shaft 341 is kept running as long as any calls are unanswered by the car.

The position of the car is determined by the members 430 and 431 and 432, which generate code signals in the manner described heretofore, which in combination with switches operated by cams and cam followers 357 to 359 and 357A to 359A provide an impulse in the cycle of rotation of the shaft 341, indicative of the position of the car. Assuming that the car is moving upward when it reaches the fourth floor, the impulse indicative of the position of the car will occur at the same time as an impulse created by the switch 339—340 and the car is brought to a stop. The car will continue upwardly until it reaches the sixth floor, at which time impulses will again coincide and the car will then stop. If no further calls have been stored in the magnetic storage elements the car will remain at this position and the motor driving the shaft 341 will stop. Upon another call being stored in one of the magnetic storage elements, the motor 344 will start and an impulse will be generated by the switch 339—340, and the car will move either up or down, depending upon the floor called, until this impulse and the impulse from the car coincides, whereupon the car will stop at the desired floor.

It will be apparent, therefore, that the polarized contact arm 339 is adapted to scan the annularly arranged magnetic storage elements to initiate movement of the car motor upon actuation of a push button; and that the car is stopped at the floor where the code signal formed by the car position levers 430, 431 and 432 (Fig. 4) coincides with the code signal formed by the cams 357, 358 and 359. This latter condition occurs only when the arm 339 is opposite the magnetic storage element corresponding to the floor at which the car is positioned. The manner in which this is accomplished will be apparent from the following more detailed description.

Referring to Figure 4 of the drawings, the switch levers 430, 431 and 432 represent car position levers located on the elevator car, which may be moved between left and right hand positions by either a cam arrangement such as illustrated in Figure 1 of my Patent No. 2,474,861, or by magnetic systems such as illustrated in Figure 14 or Figures 16 and 17 of my Patent No. 2,474,861. The zeros indicated in Figure 4 represent a left-hand position of the switch levers at the several floors, while the ones (1) indicate a right-hand position for the switch levers. The code signals generated during the movement of the car up and down the shaft for the different combination of switch positions for each floor. Each switch lever is provided with a movable contact for coaction with two stationary contacts A and B. Thus, the right-hand and left-hand positions of each switch lever will provide a separate circuit to be matched by the circuits established by the switches 363, 364 and 365 (Figure 3), as will be described in more detail in Figure 7.

An alternative code is illustrated in Figure 5. This code has the advantage that only two cams, magnets, or other activating members are required at each floor and that only one switch or other operating member need be moved as the car moves from floor to floor. From the ninth to eighteenth floor, a fourth activating member is used and the series of the first to the eighth floor is repeated. From the nineteenth to thirty-sixth floor a fifth activating member is used. But irrespective of the number of floors only two activating members are needed for each floor, and only one operating member is moved at each floor.

As the motor 334 revolves the shaft 341, the polarized contact arm 339 and the cams 357, 358 and 359 are rotated, causing the arm 339 to pass between the pole pieces of the storage magnets 331 to 337. Assuming that the shaft 341 revolves in counterclockwise direction and that Figure 30 indicates the initial position of the arm, the relation of the arm to the storage magnets and the code generated by the cams 357, 358 and 359 will be as indicated in the following table:

| Floors | Car Buttons | Storage Magnet | Radial Positions of Polarized arm 339 in Degrees Counterclockwise from Initial Position | Cam Positions | | |
|---|---|---|---|---|---|---|
| | | | | 359 | 358 | 357 |
| | | | 0 to 22½ | 0 | 0 | 0 |
| 7F | 308 | 337 | 22½ to 67½ | 1 | 0 | 1 |
| 6F | 307 | 336 | 67½ to 112½ | 1 | 1 | 1 |
| 5F | 306 | 335 | 112½ to 157½ | 1 | 1 | 0 |
| 4F | 305 | 334 | 157½ to 202½ | 1 | 0 | 0 |
| 3F | 304 | 333 | 202½ to 247½ | 0 | 0 | 1 |
| 2F | 303 | 332 | 247½ to 292½ | 0 | 1 | 1 |
| 1F | 302 | 331 | 292½ to 337½ | 0 | 1 | 0 |
| | | | 337½ to 360 | 0 | 0 | 0 |

The symbols (0) and (1) of the table represent the lower and upper positions of the cam follower arm 357A, 358A and 359A (Figure 3).

Comparing Figure 4 with the above table, it will be apparent that the code signals generated by the cams 357, 358 and 359 for corresponding floors are the same as those generated by the switch levers 430, 431 and 432. From the table and the shapes of the cams 357, 358 and 359, it will be apparent that a code signal of switch positions will be generated during the rotation of the shaft 341 which will, in effect, continually and repeatedly scan the code signals generated by the car position levers to complete a controlling circuit when the code signal generated by the cams 357, 358 and 359 exactly matches the code signal generated by the car position.

The direction of movement of the car is determined by the relation of the radial position of the arm 339 when the code signal generated by the cams 363, 364 and 365 match the car position code signal when the car is free to answer a call, to the radial position of the arm 339 when it is actuated by the magnetic storage element containing the stored magnetic flux representing a registered call. Should the arm 339 in moving counterclockwise from the initial position indicated in Fig. 2 pass through a position where the code signals of the cams 363, 364 and 365 match the car position code signal prior to a position where the arm 339 is actuated by a stored call, such relation will indicate that the call is for a floor below the car position. Conversely, should the arm 339 be actuated at a radial position prior to its reaching a position where the code signals are matched, such relation will indicate that the call is from a floor above the car and the car will be moved upwardly in response thereto.

Since a time delay mechanism is necessary to provide a time period during which the car gate is opened and held open for passengers to enter or leave the elevator car, such a mechanism is included and indicated diagrammatically at 346; it is driven through a reduction gearing 345 from the motor 344. The construction and function of the time delay mechanism is the same as the time delay mechanism 6C of Figure 6 of my Patent No. 2,474,861, except that a different switch arrangement is required. Figure 6 shows a fragmentary view of the time delay mechanism comprising the time cylinder 408 and a series of reciprocable pins 411 for coactive operation with the armature 410 of the electromagnet 409. As described in connection with the time delay mechanism 6C of my Patent No. 2,474,861, the switch arm 406 is adapted to be actuated one-half a minute after the first pin 411 has been depressed by energization of the magnet 409. The movement of the arm 406 to the right, as viewed in Figure 6, in response to pins depressed by the armature 410, causes the switches 405F and 405G to be opened and held open until the last depressed pin 411 has disengaged the arm 406.

A wiring diagram for an automatic elevator system provided with the magnetic control means of Figures 1 to 6 is schematically illustrated in Figure 7. The portion of the wiring diagram indicated by the bracket 34A includes the circuits for registering calls from the hall push buttons 10 to 16, inclusive, together with a decoding circuit including relays A, B and C, which function to decode the signals received from the car button code signal generating system of Figures 24 to 26 of my Patent No. 2,474,861. The portion of the wiring diagram indicated by the bracket 34B includes the car position indicator switch levers 430, 431 and 432 and the series connective relationship therewith of the cam actuated switches 363, 364 and 365 which determine the establishment of the direction controlling circuits indicated by the bracket 34C. The portion of the wiring diagram indicated by the bracket 34D includes those circuits which control the opening and closing of the elevator gate, the energizing and deenergizing of the elevator motor 8 and the control of the electromagnetic brake 5. This latter control circuit arrangement is substantially identical with the corresponding control circuits illustrated in Figures 9 and 9A of my Patent No. 2,474,861. In this portion of the wiring diagram I have indicated those relays and switches which are identical in function to those of Figure 9 of my Patent No. 2,474,861 with the same respective symbols. Since gate motor 9 and elevator car motor 8 circuits, of the instant form, are identical with those of Figure 9A, reference to Figure 9A of my Patent No. 2,474,861 is made to avoid unnecessary duplication.

The diagram of Figure 7 shows the position of switches when the system is idle. Assuming that the elevator car is at the first floor and that the car push button 304 (Figures 24, 25 and 26 of my Patent No. 2,474,861) for the third floor has been actuated, the bars 311, 312 and 314 will be shifted to close switches 316, 318 and 322. Switches 316 and 318 will complete circuits energizing relays C and B. The operation of the switch 322 and those of the relays C and B will cause current to flow from the line 370 through wire 367, winding STA of a master relay armature ST, wires 368, 369 and 374, switch 322, wire 375, relay contact A2, relay contact C1, wire 389, relay contact B3 and wire 387 through the winding of storage magnet 333 to the line 371. This energizes the storage pole pieces 333A and 333B with a polarity adapted to operate the polarized switch arm 339 as it scans the storage magnets. Relay contact ST2 applies full line voltage around the winding STA.

The different combinations of code bar movements obtained in response to actuation of the car buttons 302 and 308 provide the necessary circuits to energize the storage magnet corresponding to the car buttons actuated.

Should the hall button 12 for the third floor be actuated, the circuit for energizing the storage magnet 333 would be established through the winding STA, wires 368, 381 and 386, push button 12, wire 387, and magnet 333 to the line 371.

It is thus apparent that the hall push buttons are arranged in parallel with the decoding circuits of the relays A, B and C so that calls may be received simultaneously by two different systems from either the hall or the car push buttons.

The energization of the master relay ST in response to the actuation of either a hall button or a car button operates to close contacts ST1 (bracket 34C) providing a circuit through wires 393, 394 and 395 to energize the motor 344 of the magnetic control means. As long as either of the coils STA or STB are energized, ST1 is closed and the motor 344 will be maintained in operation, that is, until all registered calls have been answered.

Since the car is at the first floor, the car position levers 430, 431 and 432 will be in the position indicated in Figure 4, that is, a left-right-left position supplying a code signal 0-1-0. When the cams are revolved to a position representing the first floor, the switch 364 will be operated to open contacts 364, 364B and close contacts 364, 364A. The movement of the shaft 341 also moves the cam 355 to actuate switch 361, closing contacts 361, 361B, thereby providing a circuit through relay contact ST1, through wire 396, Time delay switch 405A, wire 397, contacts 361, 361B, wire 398, and the relay X to the line 371. The energization of the relay X closes relay contact X1 between wires 397 and 398 to provide a holding circuit for the X relay until the time delay switch 405A opens or the ST relay is released.

As the polarized contact 339 passes each of the storage magnets during a scanning operation initiated by the energization of the motor 344, the polarized contacts 339, 340 will be closed when the polarized contact arm 339 passes between the pole pieces of the storage magnet 333. The closing of contact 339, 340 completes a circuit from wire 370, relay contact ST1, wire 396, relay contact 405A, wire 397, relay contact X1, through wire 402, relay contact BR6, wire 400, contacts 339, 340, wire 401, relay contact BR7 and CO3 and relay UA to the lead 371. The energization of the relay UA closes its contacts UA1 to provide a holding circuit for the relay UA, the contacts 339, 340 being closed only momentarily as the polarized arm 339 passes the storage magnet 333.

Since the movement of the polarized contact arm 339 is counterclockwise, as viewed in Figure 2, the arm 339 will not pass between the pole pieces 331A and 331B of the magnet 331 corresponding to floor 1F until after the arm has passed the magnet 333 which corresponds to the push button for floor 3F. This fact determines whether the registered call is above or below the position of the car. For instance, were the car positioned at the seventh floor when the call from push button 12 was received, the rotation of the shaft 341 in moving the switch arm 339 opposite the magnet 337 would so position the cams 357, 358 and 359 as to produce a code signal through the switches 363, 364 and 365 which would exactly match the code signal generated by the car position levers 430, 431 and 432. Thus, were the car actually positioned above the floor from which the call was received, the circuit from wire 417 to 422 (bracket 34B) would be completed, thereby energizing the relay CO through wires 423 and relay contacts BR8 and X3. The energization of relay CO would then operate to close the relay contacts CO2 and open the relay contacts CO3, thereby determining that the down relay DA would be energized upon the closing of polarized contacts 339, 340. However, since the car was at the first floor and the contacts 339, 340 had been closed prior to the matching of the code signal generated by the cams 357, 358 and 359 with the code generated by the car position levers, the up relay UA will have been energized prior to the energization of the relay CO, thereby establishing the up direction for movement of the car.

It should be noted that during the first part of each revolution of the shaft 341, the cam 355 is caused to open the contacts 361, 361A, breaking the holding circuit for the relay CO. This action of switch 361 deenergizes the circuit to the relay CO at the beginning of each rotation of the shaft 341 to redetermine the location of the registered calls with relation to the position of the car.

The up relay UA having been energized, the closing of contacts UA2 (bracket 34C) provides a circuit from the main lead 370 through a relay contact ST1, wires 393, relay contact UA2, holding coil STB for the relay ST, polarizing coil UD1P for the relay UD1 and wire 395 to the main lead 371. The provision of this circuit insures the continued energization of the coils STB and UD1P when the rotation of the cam 356 (Figure 31) opens the switch contacts 362, 362A. The closing of switch contacts 362, 362B provides a circuit from the contact 362B through the resistance 412, wire 414, relay contact DA5, direction relay coil UD1, relay contact UA6 and wires 416 and 395 to the main lead 371. The direction relay UD1 is polarized by the coil UD1P so as to cause the contacts controlled thereby to remain in whichever position it is last actuated until the current through the relay coil UD1 has been reversed.

Referring to the portion of the diagram indicated by bracket 34D, attention is called to the fact that this diagram is substantially the same as the lower portion of the diagram illustrated in Figure 9 in my Patent No. 2,474,861. The relay UD1 having been energized through the medium of relay UA, the movable contact UD1A is moved to engage contact UD1B, thereby providing a circuit through the emergency stop switch STOP, wire 428, timer switch contact 405B, relay contacts S2 and S3, relay contacts UD1A—B, relay contact UA3, relay U, up limiting switch UL and wires 433 and 434 to hall doors switch to the line 371. The energization of the relay U closes contact U1 to provide a circuit through the emergency STOP switch, wire 435, gate closing limiting switch CL, relay CR, relay contact OR1, wire 438, relay contact U1 and wires 439 and 434 to the hall doors switches to line 371.

As described in connection with Figures 9 and 9a in my Patent No. 2,474,861, the energization of the relay CR applies current to the gate operating motor 9, causing the gate to close. When the gate is completely closed, the gate limit switch CL opens, thereby releasing the relay CR. The gate switch GATE being also closed by the closing of the gate, energizes the relay BR, which operates a series of switches, of which the contact BR3 operates to close the circuit to the electromagnetic brake 5 (Figure 1 of my Patent No. 2,474,861) to release the brake shoes 6 and 7, while contacts BR4 and BR5 operate to close the circuit to the elevator car motor 8 (Figure 9a of my Patent No. 2,474,861). The relay contact BR8 opens the circuit to relay CO. The relay contacts BR6 and BR7 open while BR10 provides, in part, a circuit to shunt the polarized contacts 339, 340 from the UA and DA relays to the S relay. The opening of relay contact BR1 and the closing of contact BR2 provides a circuit through the relay OP now that the open limiting switch OL is closed by the closing of the car gate. The relay contact BR9 opens to prevent the reset magnet 338 from being energized while the car is in motion.

When the car arrives at floor 2F, the car position lever 430 will be moved from left to right-hand position, thereby closing contact 430, 430A, furnishing a code signal 0–1–1. As the shaft 341 continues to rotate during the movement of the car, the polarized contact arm 339 will pass between the pole pieces of the magnet 332, thereby positioning the cams 357, 358 and 359 to provide a signal 0–1–1 which exactly matches the signal generated by the positions of the car levers 430, 431 and 432. This condition, however, will not energize the relay CO since relay contact BR8 remains open. Thus the car will continue upward toward the third floor where car position levers 430, 431 and 432 will assume the positions 0–0–1, as indicated in Figure 4. The rotation of the shaft 341 will soon revolve the cams 357, 358 and 359 to a position which directly matches the signal established by the positions of the levers 430, 431 and 432. Since the polarized arm 339 passes between the pole pieces of the storage magnet 333, at this moment a circuit is completed through the code matching circuits from wire 417 to 422, and on through wire 424, relay contact BR10, wire 400, polarized contacts 339, 340, wire 444 and the relay S. This also provides a circuit through the timer electromagnet 409, the relay S and magnet 409, being held in circuit by the relay contact S1. The energization of the relay S opens contacts S1 and S2 (bracket 34D) to deenergize the relay U which in turn deenergizes the relay BR to effect the deenergization of the car motor 8 and the electromagnetic brake 5, thereby stopping and holding the car at floor 3F. The relay contact BR1 being closed by the deenergization of the relay BR completes the circuit through relay OR to apply current to the gate operating motor 9, thereby moving the gate to open position where the limit switch OL is actuated to break the circuit to the relay OR.

Since the energization of the electromagnet 409 starts the operation of the time delay device (Figure 6) a time period is provided during which the gate is opened and held open for passengers to enter and exit from the car. This operation is the same as described in connection with the time delay device 6C of Figures 6 and 8 of my Patent No. 2,474,861. At the end of a predetermined period such as a half minute, the switches 405A and 405B are actuated to deenergize the circuits to the relay S and electromagnet 409, and also to break the circuit to the car control relays U and D.

The call registered in the core 333 having been answered, the polarity of the core is reversed by the reset magnet 338 which is energized at about the moment the cams 357, 358 and 359 match the code signal of the car position levers. The cam 360 being the same as the cam 359 with the contacts reversed will energize the reset magnet 338 180 degrees rotation after the polarized contact 339 has passed the magnet 333, which occurs at the moment when the reset magnet 338 passes the storage core 333, thereby effectively reversing the polarity of the core 333 without affecting the polarity of any of the other storage cores.

After the time delay device has operated to the point where there are no more pins depressed to maintain the lever 406 in switch opening position, the lever 406 will be released, thereby closing the switches 405A and 405B. The motor 344 not having been deenergized at any time during the operation of the elevator, the closing of the switch 405A provides a circuit which is completed by actuation of the switch 361 to again energize relay X. The relay contact X1 being closed by energization of the relay X provides a holding circuit for the relay X. Thus, the motor 344 is continued in operation to scan the storage magnets for additional calls. When the cams 357, 358 and 359 match the signal of the car position levers 430, 431 and 432, the circuits between wires 417 and 421 are completed to energize the relay CO. The polarized arm 339 having been given a complete rotation past the storage magnets, and not being actuated by a registered call to close the contacts 339, 340, permits the deenergization of the control system in response to the action of the cam 356 which breaks the switch contacts 362, 362A (bracket 34C), the relay contacts CO1 and X2 having, in the meantime, been opened. This action of the switch 362 breaks the circuit between wires 393 and 413, thereby deenergizing the coil STB of the relay ST. Relay contacts ST1 are thereby opened between wires 370 and 393, thus deenergizing the motor 344. This places the system out of operation until another car or hall button has been actuated.

If there had been another call or group of calls stored in the magnets 331—337, the closing of the switch 405A at the end of the time period provided by the operation of the timing device 346 of Figure 6, completes the circuit for relay X when the code signals are matched by a registered call. The resulting energization of the relays CO and X together with the operation of the polarized switch contacts 339, 340 during the scanning operation ensures a holding circuit for the coil STB and the relay ST, thereby preventing the deenergization of the motor 344. The resulting energization of relay DA or UA, as the case may be, actuates relay contacts DA5, DA6 or UA5, UA6, so as to control the direction of the current through the direction controlling relay UD1 when the switch 362 is actuated. The relay UD1 being thus energized, controls the remaining portion of the circuit to initiate the movement of the car in the proper direction.

To further illustrate the operation of the control means, assume that passengers on the second and first floor each push the hall buttons 10 and 11 respectively before the time delay device 346 (Figure 6) has operated to close the switch 405A. Actuation of buttons 10 and 11 would magnetize the storage cores 331 and 332 of a polarity adapted to operate the polarized switch arm 339. As soon as the switch 405A is closed, the operation of the cam controlled switch 361 energizes the relay X which establishes a holding circuit through its contact X1.

When the polarized switch arm 339 is opposite the storage core 333 the cams 357, 358 and 359 will have assumed positions corresponding to the car position levers 430, 431 and 432, completing a circuit between the wires 417 and 422 to energize the relay CO, which establishes a holding circuit through the relay contact CO4. The energization of relay CO also operates to open contact CO3 and close the contact CO2 so that when the polarized switch arm 339 passes the storage core 332, it will be actuated to close the contacts 339, 340 providing a circuit through wire 402, relay contact BR6, wire 400, contacts 339, 340, wire 401, relay contacts BR7 and CO2, and relay DA.

The energization of relay DA will cause the contact DA5 to be opened and DA6 to be closed, so that operation of the cam 356 closing contacts 362, 362B completes a circuit through the relay UD1 in a direction opposite to that of the current of the last call, thereby reversing the operation of the movable contact UD1A to engage stationary contact UD1C. This operation provides a circuit energizing the relay D. Relay contacts D1 are thereby closed energizing the relay CR which in turn controls the switches CR1 and CR2 (Figure 9a of my Patent No. 2,474,861) to energize the gate motor. The gate upon closing energizes the relay BR to release the brake shoes 6 and 7 and in cooperation with switches U2 and U3 to effect the energization of the car motor 8 to move the car in a downward direction.

The relay contacts BR6, BR7 and BR8 operate to release the relay CO and prepare the circuit for the energization of relay S. When the car arrives at the second floor, the circuit between wires 417 and 422 will be closed by the matching of the code signals so that actuation of the polarized switch contacts 339, 340 in passing storage core 332 will effect the energization of the S relay and the electromagnet 409. As previously described, the operation of relay contacts S2 open to deenergize the controlling relay D which effects the deenergization of the elevator motor and electromagnetic brake 5 to set the brake shoes 6 and 7 and energize the gate opening relay OP.

The relay contact BR9 operates to complete the circuit to the reset magnet 333 at the proper position of the cam 360 to reverse the polarity of the storage core 332. When the depressed pins of the time cylinder 408 open the switch 405A, the relay X will be released, thereby causing the contact X2 to close, keeping the motor 344 in operation. After the last depressed pin has passed the lever 406, the switch 405A will be permitted to close and when the cam 355 operates the switch 361, the relay X will again be energized. When the combination of cams 357, 358 and 359 again match the position of the car levers 430, 431 and 432, the relay CO will be energized to again close the contact CO2 and open the contact CO3. As the polarized arm 339 passes the storage core 331, the contacts 339, 340 will be closed to energize the down relay DA. Since this is the same direction the car last moved, no operation of the relay UD1 is required, so that upon operation of the gate closing motor 9, the releasing of the brake 5, and the energization of the car motor 8, the car will proceed in a downward direction. When the car arrives at the first floor, the car position levers 430, 431 and 432 will assume a combination of positions which match the positions of the cams 357, 358 and 359 as the polarized arm 339 passes the storage core 331. The closing of the contacts 339, 340 effect the operation of the relay S and the electromagnet 409 to stop the car, apply the brakes and cause the car gate to be opened.

After the time delay switch 405 has been actuated to open the switch 405A, the X relay is deenergized, again closing the contact X2, so that when the cam 356 opens contacts 362, 362A the circuit to the motor 344 will not be broken until after the time delay device has completed its operation and the arm 339 has again scanned the storage cores after the closing of the time switch 405A. Should the contacts 339, 340 not be actuated during the rescanning rotation of the shaft 341, during which time the relay CO is again energized, neither relay UA or DA will be energized to maintain the circuit to the motor 344. The circuit to the motor 344 being broken, by the failure of relay UA or DA (contacts UA2 or DA2) to be operated, the system comes to a standstill until another call is registered.

From the foregoing it will be apparent that during a trip of the car from one floor to another, the car will be operated to collect all calls registered in the path of movement of the car as it moved to answer the first call. Should hall buttons on the floors above the car be actuated after the relay DA has been energized in response to the call made for a lower floor, the calls from the upper floors will be stored until the car has answered the calls registered in the direction of the first call received. The direction circuits are maintained for the first direction selected until all calls in that direction of car movement have been answered.

In the foregoing description various means have been disclosed for generating code signals indicative of the position of the car for transmission over a minimum number of wires to the control means or to various types of car position indicators. Means have also been disclosed for generating push button code signals for transmission over a minimum number of wires from either a car or a dispatcher. In all of these code signal generating means, the combination of impulses, whether mechanical or electrical, have been transmitted to the control means or indicators simultaneously as a unitary signal.

As hereinafter described in connection with Figures 8 to 16 of the drawings, a form of code may also be utilized in which the signal comprises spaces and impulses transmitted consecutively and repeatedly, one or more impulses being generated in a predetermined arrangement with spaces indicative of the condition being signaled. For example, where 10 floors are serviced by the elevator system, a series of ten intervals may be provided. When the signal is used to designate the position of the car and should the car be positioned at the sixth floor, the code signal would consist of five spaces, an impulse and four spaces. In this way, the code may be adapted to indicate the particular floor at which the car is positioned, the floor to which a car is to go, or any other similar condition of the system to be indicated or transmitted.

In the illustrative embodiment to be described, the code signal generating mechanism utilizes the principle of inductance for generating the impulse or impulses in the proper relation with spaces of the code cycle. However, other means such as the mechanical or magnetic means previously described, or the previously known means such as inductors, oscillators, etc., may be arranged to provide the same character of code signal.

Before describing in detail the embodiment shown in the illustrative figures, it is believed desirable to describe the apparatus generally and its mode of operation.

Located at any position, preferably in a control room, is a master storage generator (M. S. G.) in which the up and down calls from the hall buttons are stored, and by means of which code signals are generated. The code signals so generated indicate the floors at which there are any up or down calls to be answered by the car in its upward or downward movement, and the code signal is sent to all of the cars that are serving the floors in question or to a single car if only one car is in the installation or is in operation at the time. This master code may be referred to descriptively as the up and down stopping code.

In each car is a car code signal generator (C. C. G.), which generates a code signal indicating the position of that car. This code signal also functions to reset the storage means of the master storage generator, after the call is answered, so that the storage generator may later store another call, and may be referred to descriptively as the car code or the reset code. Each car, therefore, generates a car or reset code signal indicating its position and all of these codes are transmitted to the control means comprising the master storage generator. When the code signal of any one of the cars corresponds in the necessary respects with the code signal of the master storage generator, it signifies that the car sending the corresponding code signal has moved to a floor, in either its upward or downward motion, at which there is either an up or down call, respectively. When this condition occurs, circuits are completed for the purpose of decelerating and stopping the car at that floor so that the master storage generator no longer indicates in its code signal that there is a call at that floor. Also included is means for stopping the car at the various floors in accordance with the car buttons.

There is also generated a leveling or key code signal which is sent to all of the cars. The leveling code keys the leveling relays for any car at the floor at which it is to stop so that the car that is to answer a call is properly decelerated and brought to a stop.

Also there is a code signal for synchronizing the operation of the master storage generator and the various car code signal generators.

The manner in which these operations are accomplished, and the means for doing the same, will be understood in connection with the following description.

As shown in Fig. 8 of the drawings, an electrical cable 560 may be provided within the hatch to establish fields of inductance which vary in location for the different floors to be serviced. The cable 560, energized by transformer 561, is arranged for a bank of two elevator cars, it being understood that the cable may be extended for any additional number of cars that may be installed. If desired, a separate energizing means may be arranged for each cable or for groups of cables with appropriate switches by means of which the cables may be energized at will. The cables may also be connected to the transformer in parallel with switches, if desired. In such arrangements, the energizing of the cables can be availed of for control puposes; for example, the car dispatcher can by-pass or short certain floor calls by deenergizing the cable while the car is passing those floors. Certain cars thus may be transferred from local to express service or vice versa, as desired.

The cable 560 is divided into sections, a section 560B, which is inclined from the vertical between the first and top floors, operates to induce a flow of current in the pick-up coils of a car position code signal transmitter ITA, while the section 560A is designed to provide an inductive field for inducing flow of current in pick-up coils of a car leveling code signal transmitter ITB. The section 560C for car No. 2 is identical with the section 560A and the section 560 D is identical with the section 560B for operation of the car leveling transmitter 2TB and the car position transmitter 2TA. As the description proceeds, it will be recognized that this system is adapted for application to elevator installations for servicing buildings having any number of floors, including those having a great many more floors than that indicated in the embodiment illustrated, as well as for controlling a single elevator or bank having a large number of elevator cars.

Instead of the inductive means illustrated by the cable 560, any conductive or other arrangement may be used to indicate the position of the car.

This form of my invention has the additional advantage, when used with a bank of elevators, of controlling the operation of the several cars so that the car nearest the floor from which a stop signal is received, will be stopped at that floor, the call being thereby canceled to all the other cars in the bank.

In the description to follow, all symbols using the prefix "1," such as ILI, IXI, etc., designate apparatus common to car No. 1, while those symbols having the prefix "2" refer to the apparatus common to car No. 2. If additional cars were included in the system, the prefix "3" would be used with the corresponding symbols for the apparatus of car No. 3.

Referring to the position code signal transmitting feature of this form of my invention, attention is directed to Figs. 8, 9, 14 and 15. In the illustrative embodiment, each car is provided with a car position transmitter indicated as ITA and a car leveling transmitter ITB. The transmitter ITA is provided with a series of ten pick-up coils ILI to IL10 (because the illustrative embodiment services ten floors) which are utilized to form a code signal indicative of the floor at which the car is passing in its movement up and down the hatchway. When the car is at the first floor, the pick-up coil ILI will be in inductive relation with a section of the cable 560B as indicated in Figures 9 and 15. As the car proceeds up the hatch, the coil IL2 will be brought into inductive relation with the cable 560B at or near the second floor and the coil IL3 at or near the third floor and so on until the car reaches the 10th floor.

The above embodiment is selected for simplicity of illustration. In some installations more than one coil may be provided for each floor where it is desired to detect the position of the car considerably in advance of the floor, as in high speed installations. Also, the cable 560B may be arranged other than in a straight line to permit more flexibility in the detecting of the car position at stages in advance of that described in the illustrative embodiment.

The circuits of the coils ILI to IL10 are in series with switches ITIA—B to IT10A—B, respectively, which are operated in a predetermined order by the cams ITCI to ITC10 of a car code signal generator illustrated in Fig. 14. The cams of the car code signal generator may be driven at a rate of speed sufficient to operate the switches ITIA—B to IT10A—B several times per second, such as five times per second. Thus, a voltage generated in any one of the coils ILI to IL10 will be transmitted at the moment the switch in series with that coil is closed, and form a code signal indicating the position of the car in the hatch. As hereinafter described in detail, the code signal received from the car position transmitter ITA is amplified by IQRI and transmitted in a particular timing relation with rotary magnetic storage disks ISDI and ISD2 (Fig. 16) through relay IX.

In an alternative embodiment of my invention, only one coil is used in the car position transmitter ITA, and this coil is oscillated between positions 1 and 10 at the same speed as the cams ITCI—10, thus eliminating the series switches and the contacts incident thereto. In this embodiment the means for oscilating the single coil can be operated by motor ITM and the impulse formed in the coil at the time it passes the cable 560B forms a code signal indicating the position of the car in the hatch. This can be amplified by IQRI and transmitted to the storage discs as described.

The car leveling transmitter ITB in the illustrative embodiment comprises five pick-up coils ILII to ILI5, inclusive, so mounted on the car as to be placed in inductive relation with cable section 560A. While five coils have been illustrated, a different number of coils may be selected for the same purpose. The cable 560A is provided with >-shaped sections, one for each floor, which constitutes the leveling zone for that floor. As the car is in movement, the coils ILII to ILI5 pass through the inductance field of one of the diagonal sections of the cable as the car approaches the floor level. In a manner similar to that described heretofore, by means of switches IT2D—C to IT6D—C, a code signal is generated which operates to decelerate the movement of the car (as described in detail later) until the car is brought to a standstill at the floor level to which it has been called. In certain applications if the car moves beyond the floor level, the other section of the diagonal can be used, by means of suitable circuits, to re-level the car.

Similar to that described in connection with the car position transmitter, it is also possible to substitute one pick-up coil for the five coils shown in ITB, the single coil being mounted upon a shuttle in such a manner that the coil will be oscillated past the five positions now occupied by the five coils, once for each revolution of the shaft 583 operating the cams. This arrangement would eliminate the contacts IT2C—D to IT6C—E and cams incident thereto. An impulse would be generated in the single coil at the time it passes the cable 560A forming a code signal which is similarly used to decelerate and stop the car.

A similar arrangement may comprise the substitution of a single pick-up coil for all fifteen coils to be used in scanning all fifteen positions, and connected to an output relay with other slight rearrangements in the controlling circuits of the system.

Referring to Figs. 8 and 9, the particular arrangement of the cable section 560A, therein shown, is for purposes of illustration only since many variations of the arrangement with respect to the car and the leveling coils are possible.

Figure 9 illustrates a detail that may be used to advance the code signal of the car position transmitter. In a high speed elevator operation, it is often desirable to advance the car position signal system one or more floors in advance of the car position, in order to have a sufficient opportunity to decelerate the car in advance of the floor at which it is to stop. In accomplishing this in accordance with the illustrative embodiment, an electromagnet IAV is provided with an armature 532 which is pivotally connected to a plate 567 upon which the pick-up coils ILI to ILI0 are mounted for moving the bank of coils on guide rollers 565 and 566 relative to the cable 560B. A spring 563 is connected to the armature 562 to maintain the bank of coils in normal position when the electromagnet IAV is deenergized. By this means the coils may be advanced one floor which is adequate in many installations. Should it be desirable to advance or retard the coils more than one position, this can be accomplished by using an advancing code signal comprising impulses transmitted simultaneously to operate a group of electromagnets associated with a link mechanism such as described in connection with either of the decoding devices of Figs. 15 and 29 of my Patent No. 2,474,861. The link mechanism can be connected to the plate 567 to shift the plate to as many positions as desired, according to combination used.

In Fig. 10, the up and down hall (push) buttons for a series of floors are diagrammatically illustrated. At the highest and lowest floors, FI and FI0, single buttons are provided, such as HBI and HBI0, respectively. At the other floors up and down buttons such as UHB2 and DHB2 are provided. Wires from the push buttons are connected through a cable 567 to the master storage generator MSG operated by a motor 570.

Referring to Fig. 13, the push buttons HBI, DHB2—9, UHB2—9, and HBI0 are circuited in series with switches MIA—B to MI0A—B and MIC—D to MI0C—D, which are operated by cams CI to CI0 of the master storage generator. Thus the current permitted to flow by a floor push button will be transmitted at the moment the switch in series with that push button is closed by the cam. A code signal is formed indicating which floor button has been pushed and is transmitted in timing relation with rotary magnetic storage discs UHS and DHS.

There will now be described in more detail the storage of the signals generated by the hall push buttons. The master storage generator MSG (Fig. 11) is provided with a pair of discs UHS and DHS for storing the hall button signals transmitted by the code signal through the cam operated switches. The storage discs are carried on a shaft 571a driven by a motor 570 adapted to be energized while the elevator system is in service. The shaft 571a also carries the cams CI to CI0 inclusive, which operate the switches MIA—B to MI0A—B, respectively, as mentioned above. The discs UHS and DHS are provided with teeth or sections at their peripheries in which magnetic flux of a predetermined polarity may be stored; two electromagnets UPM and DPM, one for each disc, are arranged in magnetizing relation with the adjacent pole pieces of the disc teeth. The magnet UPM is provided to magnetize and demagnetize, or reverse the magnetism, in the teeth of the disc UHS while a magnet DPM is provided to magnetize and demagnetize, or reverse the magnetism, in the teeth of the disc DHS.

The discs are provided with a peripheral groove dividing the tooth sections into adjacent pole pieces. A polarized switch UPCI is provided for extension into the annular space between the pole portions of the teeth of the disc UHS. When the tooth portions of the disc UHS are magnetized with a predetermined polarity, the switch UPCI will be momentarily attracted to a position to close with the contact UPC2 each time a pair of properly magnetized tooth portions pass the polarized switch. A similar polarized switch DPC1 is provided in the same relation with the disc DHS for closing the contact DPC2 in response to stored magnetic flux in the teeth of the disc DHS. The teeth of the discs UHS and DHS move past the magnets UPM and DPM in synchronism with the action of the switches M1A—B to M10A—B and M1C—D to M10C—D which are actuated by the cams C1 to C10. These switches are included in circuits for energizing the electromagnets UPM or DPM, as the case may be, to store magnetic flux in the tooth portions of the disc corresponding with the circuit completed by a hall button and the corresponding cam actuated switch (see Fig. 13). In this way, magnetic flux is stored in the tooth portions of the disc corresponding to the push button that has been actuated.

Since the top and bottom floors need but one push button each, one of the tooth portions on the disc UHS and one of the tooth portions on the disc DHS will not be used for storing magnetic flux in response to hall calls. These two teeth, however, may be used for synchronizing purposes, or for other purposes, if desired.

The electrical connections of the hall push buttons, cam actuated switches, electromagnets UPM and DPM and the associated polarized switches for impressing electrical impulses upon buses BU1 and BU2 which lead to the control means of each car of the bank are illustrated in the electrical diagram of Figure 13. To trace a circuit for impressing a code signal upon the buses, assume for purposes of illustration that no signals have previously been recorded and that now the up button UHB4 on the fourth floor is momentarily pushed. The closing of the push button contact need only be momentary since the rapid rotation of the motor 570 will scan all the buttons of the floors to be serviced during an exceedingly short period, and assume that the switch M4C—D will be closed while the push button UHB4 is closed.

As the cam shaft 571a is revolved, a circuit will be completed upon operation of the switch M4C—D from the line 571 through the wire 572, push button UHB4, switch contacts M4C, M4D, wire 573, relay contacts URS1, wire 574, electromagnet UPM, wires 575 and 579, relay contacts URS2 and wire 576 to the line 580. Since the tooth portions 4 of the disc UHS are in radial alignment with the electromagnet UPM at the time the switch M4C—D is closed, the tooth portions 4 will be magnetized a given polarity by the electromagnet UPM at the moment that the tooth 4 passes beneath the electromagnet UPM. The call from push button UHB4 is thus stored magnetically in the tooth portions 4 of the disc UHS.

At each revolution of the shaft 571a, the tooth portions 4 of the disc UHS will pass the polarized contact UPC1 and when the tooth 4 is magnetized as described above, the polarized contact UPC1 will be actuated to engage the contact UPC2. The closing of the polarized switch UPC1—2 establishes a circuit from line 571, wire 577 through switch contacts UPC1—2 and the wire 578 to the bus BU1. Assuming that the shaft 571a is revolved five times per second, a code signal indicating a call from the fourth floor will comprise three spaces, an electrical impulse and six spaces, and will be impressed upon the bus BU1. As long as the stored magnetism remains in the tooth portions 4, this code signal will be transmitted over the bus BU1 five times per second.

Should the eighth floor up button UHB8 be pushed, thereby magnetizing the portions of the eighth tooth of the disc UHS, the composition of the code signal will be changed. The code signal will then be three spaces, electrical impulse, three spaces, electrical impulse and two spaces. Should all of the hall up buttons be actuated, thereby magnetizing the first nine teeth of the disc UHS, the signal would be nine electrical impulses and one space.

The operation of storing calls from the hall down buttons in the disc DHS and thereby impressing a down code signal on the bus BU2 is the same as that described in connection with the up hall buttons.

As will be described later, the signals impressed on the buses BU1 and BU2 are utilized to stop any one or any selected one of the cars in the bank to answer the calls initiated by the passengers in the halls.

At each revolution of the storage discs the number of unanswered calls stored therein can be counted by any suitable counting mechanism or the number unanswered in any portion of the total. The number of calls so determined could be used to operate a quota system, that is, when the number of total calls or calls in any given subdivision exceeds any predetermined set number, certain cars would shift from local to express service or vice versa, for all or a part of their trip, or call additional cars into service.

After the hall call has been answered by the proper car, the storage disc UHS (or DHS) must have the stored call erased therefrom in order to prevent other cars from stopping for the same call and in order to be able to store another later call from the same floor of the hall. To accomplish this, the magnetic flux stored in the storage disc is reversed by a reset code signal received from any of the car position code signal transmitters 1TA or 2TA or 3TA, etc., which corresponds exactly with the code signal of the floor from which the call was received. This will occur when a car is at the floor at which there has been a hall call. The reset code signals are generated by polarized switches 1PC4—5, 2PC4—5, 3PC4—5, etc., of transmitters 1TA, 2TA or 3TA, etc., and impressed upon buses BU3 or BU4 according to the position of the contacts 1U2 or 1D2 of directional relays 1U or 1D to operate relays URS, DRS (Fig. 13). When the signal is generated by the upward movement of the car upon its arrival at the designated floor, the relay URS is energized to operate contacts URS1—2—3—4 to provide a circuit through the electromagnet UPM reversing the magnetic flux in timed relation with the movement of the tooth portions 4 as they pass beneath the electromagnet UPM. The circuit for reversing the magnetism may be traced from the line 571 over wire 577, contact URS4, wire 575, electromagnet UPM, wire 574, contacts URS3 and wire 576, to the line 580. The car code signal generator CCG is synchronized with the master storage generator MSG in a manner described herebelow. As a result, switches 1T1A—B to 1T10A—B operated by the shafts 583, operate in timed relation with the disc UHS operated by shaft 571a. Assuming that an up call from the fourth floor up hall button has been answered by a car, it will thus be understood, because of the synchronized relation of the two generators, that the operation of the reset relay URS will be in time relation with the positioning of the tooth portions 4 of the disc UHS beneath the electromagnet UPM to reverse the magnetism in the tooth portions 4 only. The resetting or reversing circuit for the electromagnet DPM is similarly controlled by the relay DRS.

In order to properly synchronize the car code signal generators CCG (shown in Figure 14) with the master storage generator MSG (shown in Figure 11), switch contacts MIH and MIG are actuated by the cam CI and cam lift CLI of the master storage generator (Figures 11, 12 and 13) to impress an impulse upon the bus BU5 once for each rotation of the shaft 571a, and at a given point in its rotation. This impulse is used to synchronize the various car code signal generators CCG with the master storage generator by operating a clutch associated with the shaft 583 of each car code signal generator.

In Fig. 14 the shaft 583 of the car code signal generator CCG is shown provided with a clutch member 586 for gripping relation with a clutch member 587, carried by a cam shaft 583A. A spring 584 normally biases the clutch member 587 into clutching relation with the member 586. An electromagnet ICL is in series with bus BU5, and is therefore energized at a particular point in each revolution of the shaft 571a of the master storage generator MSG. The electromagnet ICL is associated with the clutch member 587 for engagement with a cam 588 on the clutch member 587 to move it to non-clutching position when the magnet ICL is deenergized at the time the cam 588 reaches the position of the armature follower ICLA.

When the master storage generator and the car code generator are in synchronism the magnet ICL is energized by an impulse through bus BU5 and the switches MIG—H and ITIC—D at the moment the cam 588 reaches the position of the armature ICLA, the armature will be lifted by the energized magnet ICL to pass over the cam 588. The spring 584 will thus be permitted to maintain the clutch members 586 and 587 in engagement, whereby the motor ITM continues to drive the cam shaft 583A.

Should the master storage generator or any one of the car code generators for any reason fall out of synchronism, the impulse generated by switch MIG—H will not be energized in time relation to the movement of the cam 588 nor with the closing of switch ITIC—D. The armature ICLA, not being actuated by the magnet ICL at the moment the cam 588 reaches the position of the armature, the clutch member 587 will be thereby disengaged from the member 586 with the switch ITIC—D in closed position. When the magnet ICL is energized by a synchronizing signal or impulse impressed upon the bus BU5 by the switch contacts MIG—H of the master storage generator (Figs. 11, 12 and 13) the clutch member 587 will be released by operation of the armature ICLA for engagement with the member 586, thereby placing the cam shaft 583A of the car code generator in synchronism with the master storage generator.

When it is desired to place a particular elevator car into operation, such as car No. 1, a master switch ISS (see bottom of Figure 16) is closed to energize a relay IST. The relay IST operates contacts IST3—4—5 to apply current through power lines PHI—2—3 to operate the synchronous motor ITM of the car code signal generator CCG and the driving motor IGM for the generator IG which in turn drives the elevator motor IEM. The switch contacts MIG—H (Figures 11 and 13) are being closed in response to the operation of the motor 570 of the master storage generator and impulses conveyed to the bus BU5 energize the magnet ICL (Figures 14 and 16) permitting the clutch members 586 and 587 to engage for synchronous operation of the cam shaft 583A with shaft 571a, thus the car code signal generator CCG of elevator No. 1 is in synchronous operation with the master generator MSG, and the elevator car No. 1 will be ready to respond to any call received from the hall or car buttons.

It will be understood that as many cars as desired may be in the elevator bank and that each car has a car code signal generator, which may be brought into synchronous operation with the master storage generator whenever desired.

Assume that elevator No. 1 is to be used and that car buttons ISB2 and ICB5 (Figures 14 and 16) are actuated so that the car is to stop at the second and fifth floors. The call from car button ICB2 will complete a circuit when the cam shaft 583A moves the cam ITC2 sufficient to actuate the switch IT2E. This circuit will extend from the line 571 through the wires 590, 591, switch IPC3—4, wire 592, button ICB2, switch IT2E, wire 593, coil IPM2 of the electromagnet IPM and the wire 594 to the line 580. The energization of the electromagnet IPM in response to the timely operation of the switch IT2E magnetizes the portions of tooth No. 2 of the disc ISDI. Likewise, the cam ITC5 will close the contacts IT5E to energize the electromagnet IPM to magnetize the portions of tooth No. 5.

If the operator now moves the control handle ICS for operating the elevator to close contact ICS2, the relays IU and IB will be energized. The relay contact IU6 is closed by the up relay IU to provide a holding circuit for the relays IU and IB until the car is stopped at another floor, thus permitting the manually actuated control to return to normal position. The energization of the relay IB operates contact IB3 to energize the electromagnet brake IBR, thereby releasing the elevator car for movement. The operation of relay contacts IU4, IU5 and IB2 closes a circuit to energize the field IGF of the generator IG. This circuit extends from the line 571 through wire 594, relay contacts IU5, generator field IGF and relay contacts IS4, IU4, and IB2 to the line 580. The field of the generator being energized, current will be produced to drive the elevator motor IEM, causing the car to proceed upwardly toward floor 2F.

The closing of relay contact IU7 energizes the advancing magnet IAV to shift the pick-up coils ILI to IL10 (Fig. 9) so that the pick-up coil IL2 is in advanced inductive relation with cable 560B. The position of the coil adjacent the cable will cause a current to be induced in the coil, which as explained before, passes through switch ITIA—B when the latter is closed by the cam ITC7. This current passes through an amplifier IQRI to the relay IX which pulsates and operates its contacts IXI and IX2 as the No. 2 tooth of the disc ISDI passes the polarized contact IPCI—2. Since tooth No. 2 has been magnetized in response to a call by the car button ICB2, the polarized contacts IPCI, IPC2 will be closed, and together with the relay contact IX2 provides a circuit from line 571 over wires 590, 595, relay contact IX2, polarized switch IPCI—2, relay contact IS5, wire 597 to the operating winding ISA of the relay IS. The energization of the relay IS closes the contact ISI to provide a holding circuit for the holding winding ISA until the car is stopped. The energization of the relay 1S also opens contact 1S8 to deenergize the electromagnet 1AV, thereby permitting the coils 1L1 to 1L10 to return to normal position. The relay 1S also operates to open contacts 1S2 and 1S4 and closes the contact 1S3 to insert a predetermined resistance 600 in the circuit of the field 1GF of the generator 1G, to start the deceleration of the car for stopping at floor F2. The car must now be further decelerated and leveled. In this action the leveling coils 1L11 to 1L15 play a part and the E. M. F. generated in them and amplified by the amplifier 1QR2 passes through relay contact 1S6 to operate the relay 1Y which also functions in achieving the leveling, as will be described. The relay contact 1S6 (Figure 15) has been closed by relay 1S which is energized when the car is to stop at the designated floor. The relay contact 1S6 remains open except when the car is to stop and be leveled.

The busses BU6 to BU10 (Figs. 13 and 16) also play a part in the leveling action and they carry what is termed a key-code signal that is also used in leveling the car at the floor at which the car is to stop. The key-code signal consists of impulses over the buses BU6 to BU10 which are determined by a series of switches M2E—F to M6E—F. These switches are operated in consecutive order by the cams C2 to C6 on the shaft 571a driven by the motor 570 (Fig. 11) at a suitable rate, such as five times a second.

In the leveling operation, the coils 1L11 to 1L15 of the car leveling code transmitters 1TB, 2TB, etc. are brought into inductive relation with the diagonal portions of cables 560A—560C, etc., as described heretofore. In series with the coils 1L11 to 1L15 are switches 1T2D—C to 1T6D—C which are operated by the cams 1TC2—1TC6 mounted on shaft 583A driven synchronously with shaft 571A. The voltage generated in any of the leveling coils 1L11 to 1L15 passes through switches 1T2D—C to 1T6D—C as these switches are closed. This is amplified through amplifier 1QR2 to operate relay 1Y. The relation of the impulses and spaces of the code signal received from the leveling coils 1L11 to 1L15, in respect to the key-code signal, is determined by the switches 1T2D—C to 1T6D—C of the car code generator CCG (Fig. 14) which are in synchronous operation with the switches M2E—F to M6E—F, respectively. Because of the synchronous relation of the car leveling code signal and the key-code signal, as will be more apparent from the later description, the functions performed by the operation of the relay 1Y in response to the signals received from the coils 1L11 to 1L15 through the amplifier 1QR2, is controlled by the timing impulses of the key-code signal from busses BU6—BU10. As a result, resistances are inserted in the field of the car generator to slow down the movement of the car as the car approaches the level of the floor corresponding to the call being answered.

Referring to the action in more detail, as the car approaches a floor at which the car is to stop, the coils 1L1 to 1L15 will pass the cable 560A in consecutive order. The inductive field of the cable is preferably arranged to overlap adjacent coils as one leaves and the other enters the effective zone of the cable. An electromotive force will thus be induced in the coils in the order of 1L11; 1L11—12; 1L12; 1L12—13; 1L13; 1L13—14; 1L14; 1L14—15; and 1L15.

Assume, in accordance with the illustrative example, that as the car approaches the second floor at which it is to stop, the coil 1L11 enters the inductive field of the cable 560A, and the relay 1Y (Figure 15) will receive an impulse at the time the associated switch 1T6C—D is closed. When the relay 1Y is energized, all of the contacts 1Y1 to 1Y10 (Figure 16) will be operated. These contacts are connected with the busses BU6—BU10 and operate relays 1M, 1N, 1P, 1Q and 1R, as shown in Figure 16. It will be apparent, therefore, that if at the moment the relay 1Y is energized there is an impulse in the bus BU6, the position of switches 1Y1 and 1Y2 will permit the relay 1M to be energized by the impulse from BU6. If, however, the relay 1Y is not energized at the moment an impulse is received on the bus BU6, the relay 1M will not be operated. Since the impulses that energize the relay 1Y are determined by switches 1T2—D—C to 1T6D—C which operate synchronously with the key-code, it will be apparent that relay 1Y and bus BU6 will not be energized simultaneously except when the impulse operating the relay is from coil 1L11.

The relays 1M, 1N, 1P, 1Q and 1R are of the electropolar type, being sufficiently polarized by polarizing coils 1MP, 1NP, 1PP, 1QP, and 1RP, respectively, so that when the relays are momentarily energized with a given polarity, they will remain magnetically attracted to the position last assumed until a reversing current is received.

The energization of relay 1M opens contacts 1M1 and closes contacts 1M2 and 1M3. This operation adds the resistance 601 to the generator field 1GF of the generator 1G to further reduce the speed of the car. As long as the relay 1Y remains energized the contact 1Y1 is closed and contact 1Y2 is open, and as long as the relay 1Y is energized in time relation with the impulses received over the bus BU6, the relay 1M will remain in actuated position because of the position of relay contacts 1Y1 and 1Y2. But when the relay 1Y is not energized the contact 1Y1 will open and the contact 1Y2 will close, and when the next impulse comes over bus BU6 the relay 1M will reverse, because of the changed position of relay contacts 1Y1 and 1Y2, and close contacts 1M1 and open contacts 1M2 and 1M3.

As the car proceeds toward the floor level of the floor F2, the coil 1L12 will pass into the inductive field of the cable 560A just before the coil 1L11 leaves the field, thus creating impulses in both of these coils and maintaining the relay 1Y energized for the duration of the impulses received over both busses BU6 and BU7. The relays 1M and 1N are thus both actuated to operative position. The opening of relay contact 1N1 and the closing of relay contacts 1N2 and 1N3 operates to insert an additional resistance 603 into the field 1GF of the generator, thereby further reducing the speed of the car. When they coil 1L11 leaves the inductive field of the cable the relay 1M is reversed by the next impulse received over the bus BU6. This opens relay contacts 1M2 and 1M3 and closes the switch 1M1 thereby introducing resistance 602 which had been previously shunted by relay contacts 1M2 and 1M3. As the coil 1L13 enters and leaves the inductive field of the cable 560A, the impulses transmitted over the busses BU8 will energize the relay 1P to thereby insert the additional resistances in the order of 605 and 604. As the coil 1L14 enters the inductive field of the cable impulses over bus BU9 will energize relay 1Q inserting additional resistances in the order of 607 and 606, and also closing contact 1Q4 which is in series with relays 1U and 1B. When coil 1L15 enters the inductive field of the cable impulses over bus BU10 will energize relay IR and insert additional resistances in the order of 609 and 608, and also open contact IR3 in series with relays IU and IB.

When the coil IL14 leaves the field of cable 560A, the relay IQ will be reversed by an impulse over the bus BU9, thereby opening the contact IQ4 which parallels the relay contact IR3, the latter having been opened because of the prior energization of the relay IR. This breaks the circuit to the relays IU and IB. The opening of the relay contacts IU4 and IB2 opens the circuit to the generator field IGF while the opening of relay contact IB3 releases the electromagnetic brake IBR. This operation stops the elevator motor and sets the brake to hold the elevator car at floor 2F.

The opening of the contact IB1 in response to the energization of the relay IB, deenergized the winding ISA to release the relay IS, thereby conditioning the circuits for leveling at the next stop. The deenergization of the relay IS opens the contact IS6 (Figure 15) breaking the circuit to the relay IY to thereby effect the reversal of the relay IR to remove the imposed resistances 600—609 from the generator field IGF.

The stored magnetic flux in the tooth portions No. 2 is reversed as the car comes into the leveling zone in order to prevent other cars from stopping for passengers at this floor and to be in condition to store another call later. This is accomplished as follows: The operation of the relay IM, as the car comes into the leveling zone, closes the contact IM4, establishing a circuit through the wire 590, relay contacts IX2 and IM4, switch IAV1, coil IPR2 of the electromagnet IPR and wire 594 to the lead 580. The energization of the electromagnet IPR operates to magnetize the tooth No. 7 which is diametrically opposite to tooth No. 2 of the disc ISD2. During continued revolution of the motor ITM, the tooth No. 7 of the disc ISD2 passes the polarized contact IPC4, causing the contact to close with the stationary contact IPC6, thereby establishing a circuit through wire 590, 591, contacts IPC4—6, relay contact IST1, coil IPM1 of the electromagnet IPM and wire 594 to the lead 580. The energization of the coil IPM1 reverses the magnetism in the tooth No. 2 of disc ISD1, since the portions thereof will be adjacent the electromagnet IPM at the precise moment that the tooth No. 7 of the disc ISD2 is adjacent the polarized switch IPC4. Thus, the registered call from the button ICB2 has been answered by the car and promptly cancelled.

As the car leaves the second floor in its upward trip, the contact IB4 of the relay IB being closed, a circuit is established through the contact IS7 to the winding IPR1 of the electromagnet IPR in a direction to reverse the magnetism in the portions of the tooth No. 7 of the disc ISD2.

Should the corresponding hall button UHB2 have registered a call on the disc UHS, the same cancelling or reset operation would operate to reverse the magnetism of the tooth portions No. 2 of the disc UHS (Figure 13). Since the relay IU remains energized until the coil IL15 has entered the inductive field of the cable 560A, the relay contact IU2 (Figure 16) will be closed during the operation of the polarized contact IPC4 described above. This provides a circuit from the wire 591 through polarized contacts IPC4—5, relay contact IU2, to the bus BU3. This impulse causes the relay URS (Figure 13) to pulse as tooth No. 2 of disc UHS passes magnet UPM, opening contacts URS1 and URS2 and closing contacts URS3 and URS4. As previously traced, this provides a circuit through the electromagnet UPM in such a direction as to reverse the magnetism stored in the tooth portions No. 2 of the disc UHS, thereby cancelling any hall signal which may have been stored for up cars to the second floor.

This cancelling or reset code signal being impressed upon the bus BU3, prevents other cars of a bank of cars from stopping at a floor for a call which has already been answered by another car.

Suitable car gate controls are of course contemplated for each car as well as circuit means for operating car position indicators and hall lanterns.

A call for the second floor having been answered, the car will proceed in the up direction toward the fifth floor in response to the closing of the operator's switch ICS1—2. As the car approaches the fifth floor, the controlling circuits will be operated in the manner described in connection with floor F2, and the car brought to rest by the leveling circuits at floor F5.

The leveling mechanism is rendered non-responsive to the action of the cable 560 upon the leveling coils IL11 to IL15 at floors F3 and F4, since the circuit to the relay IY is maintained open by the relay contact IS6 and this contact is not closed by relay IS until the car reaches floor F5. When the car answers the fifth floor call, the magnetism stored in the tooth portions No. 5 of the disc ISD1 will be reversed, thereby cancelling the registered call.

When the master switch ISS is opened to shut down the elevator car, the relay IST will be deenergized. This will cause the relay contact IST1 to open and the relay contact IST2 to be closed, before the governor IGV of the motor ITM decelerates to a low speed, the governor contacts are closed to provide a current through the windings IPM1 and IPR1 of the electromagnets IPM and IPR to magnetize all of the teeth of the discs ISD1 and ISD2 of a polarity indicating that no signals are stored. This circuit eliminates the necessity of synchronizing the storage discs ISD1 and ISD2 to the master machine when the motor ITM is energized. It is preferable that the teeth of the clutch members 586 and 587 are such as to align the teeth of the disc in synchronous operation with the switches associated with the cams ITC1 to ITC10 respectively.

While I have shown and described several forms and variations of the invention, I am fully aware that many additional modifications are possible. For this reason, it should be understood that the forms of the invention herein illustrated and described are intended to be illustrative of the invention only and not as limiting the scope of the appended claims.

I claim:

1. A control system comprising means for storing signals in the form of magnetism; means for generating a first code from said magnetic storage; means for generating a second code; means for comparing said first and second code; and means for achieving the control when the comparison of the two codes indicates that the control is to be effected.

2. A control system comprising means for storing signals in the form of magnetism; means for generating a first code from the magnetic storage in which at least one signal is spaced in a given time interval; means for generating a second code in which at least one signal is spaced in a given time interval; means for comparing said first and second codes; and means for achieving the control when the signals in the two codes coincide.

3. A control system comprising means for initiating electrical signals indicative of the action to be performed; means for converting said electrical signal to magnetism and for storing said signals in the form of residual magnetism; means for generating a first code from the magnetic storage in which at least one signal is spaced in a given time interval; means for generating a second code indicative of the ability of the action to be performed and comprising at least one signal spaced in a given time interval; means for comparing said first and second codes; and means for achieving the control to effect the desired action when the two codes coincide.

DONALD R. PUTT.

No references cited.